(12) United States Patent
Tamatani et al.

(10) Patent No.: US 7,635,438 B2
(45) Date of Patent: Dec. 22, 2009

(54) LUMINESCENT MATERIAL

(75) Inventors: Masaaki Tamatani, Fujisawa (JP); Hisayo Uetake, Yokohama (JP); Ryosuke Hiramatsu, Kawasaki (JP); Kazuaki Ootsuka, Yokosuka (JP); Yasushi Hattori, Kawasaki (JP); Naomi Shida, Tokyo (JP)

(73) Assignees: Kabushiki Kaisha Toshiba, Tokyo (JP); Toshiba Lighting & Technology Corporation, Tokyo (JP)

( * ) Notice: Subject to any disclaimer, the term of this patent is extended or adjusted under 35 U.S.C. 154(b) by 301 days.

(21) Appl. No.: 11/779,370

(22) Filed: Jul. 18, 2007

(65) Prior Publication Data
US 2008/0017831 A1   Jan. 24, 2008

(30) Foreign Application Priority Data
Jul. 19, 2006   (JP)   ............... 2006-197302

(51) Int. Cl.
*C09K 11/79*   (2006.01)
(52) U.S. Cl. .............. 252/301.4 F; 313/503; 257/98
(58) Field of Classification Search ........... 252/301.4 F; 313/503; 257/98
See application file for complete search history.

(56) References Cited

U.S. PATENT DOCUMENTS

2005/0199897 A1  9/2005 Setlur et al.
2007/0090381 A1  4/2007 Otsuka et al.
2008/0185956 A1*  8/2008 Hiramatsu .................. 313/498

FOREIGN PATENT DOCUMENTS

JP   2005-277441   10/2005

OTHER PUBLICATIONS

Barry, Fluorescence of Eu2+-Activated Phases in Binary Alkaline Earth Orthosilicate Systems, Journal of Electrochemical Society, 1968, vol. 115, No. 11, pp. 1181-1184.

* cited by examiner

Primary Examiner—C. Melissa Koslow
(74) Attorney, Agent, or Firm—Turocy & Watson, LLP (57) ABSTRACT

A europium-activated alkaline earth orthosilicate luminescent material is provided, which includes a compound having a composition represented by a following formula 1:

$$(Sr_xBa_yCa_zEu_w)_2SiO_4 \quad \text{formula 1}$$

wherein, x, y, z and w satisfy following relational expressions 2, and 4 to 7, and are values satisfying the expression 3 when a, b, c and d are assumed to be 573, 467, 623 and 736, respectively:

| | |
|---|---|
| $x+y+z+w=1$ | expression 2 |
| $600 \leq ax+by+cz+dw$ | expression 3 |
| $0 \leq x/(1-w) \leq 0.95$ | expression 4 |
| $0 \leq y/(1-w) \leq 0.4$ | expression 5 |
| $0 < z/(1-w) \leq 0.95$ | expression 6 |
| $0.02 \leq w \leq 0.2$ | expression 7 | the luminescent material shows an emission band having a peak wavelength of 600 nm or more when the luminescent material is excited by ultraviolet radiation having a wavelength of 254 nm.

19 Claims, 6 Drawing Sheets

LUMINESCENT MATERIAL

CROSS-REFERENCE TO RELATED APPLICATIONS

This application is based upon and claims the benefit of priority from prior Japanese Patent Application No. 2006-197302, filed Jul. 19, 2006, the entire contents of which are incorporated herein by reference.

BACKGROUND OF THE INVENTION

1. Field of the Invention

The present invention relates to a luminescent material, a method of manufacturing a luminescent material, and a light-emitting device.

2. Description of the Related Art

Conventionally, a luminescent material of the YAG:Ce series that emits yellow light has been used for a white LED. As this luminescent material emits only weak light upon excitation by near-ultraviolet radiation, a light source is limited to blue-emitting one. In addition, because red component intensity is weak in an emission spectrum, for making a white light having a low color temperature, color rendering properties are considerably reduced. Although there have been made attempts to improve the color rendering properties by mixing red luminescent materials of a nitride series, homogeneous mixing is difficult since the chemical composition or crystal system of constituents of a yellow luminescent material and of a red luminescent material are different. Yet, yellow luminescent materials and red luminescent materials have to be synthesized with different equipment and by different methods, and the latter of the nitride series needs to be synthesized at high temperatures of 1600° C. or higher. Thus, the manufacturing cost is very high.

As a luminescent material that is excited by light having a wavelength ranging from 360 to 500 nm and that emits green light to yellow light, a divalent europium-activated alkaline earth orthosilicate luminescent material $(Sr_x, Ba_y, Ca_z, Eu_w)_2 SiO_4$ has been known. Emission colors of the luminescent material vary, depending on the kind of alkaline earths or a proportion thereof. A white LED to which such the luminescent material is applied is also proposed.

Such luminescent material can be manufactured with standard equipment or by a standard method even though emission colors are different. The sintering temperature necessary for the manufacture are 1000 to 1500° C., and if the temperature is higher than this, the cost needed for the equipment would be higher. In addition, although emission colors are different, homogeneous mixing is easier because a crystalline structure is identical and chemical and physical properties are similar. Therefore, if emission of a peak wavelength in a red region is achieved, a luminescent material showing this emission and a yellow or green emitting luminescent material are mixed, thereby enabling improvement of color rendering properties even though the light is white of a low temperature. It is currently reported, however, that the peak wavelength of emission is 505 to 598 nm.

BRIEF SUMMARY OF THE INVENTION

A luminescent material according to one aspect of the present invention comprises a compound having a composition represented by the following formula 1 and showing an emission band having a peak wavelength of 600 nm or more when it is excited by ultraviolet radiation having a wavelength of 254 nm:

$$(Sr_xBa_yCa_zEu_w)_2SiO_4 \qquad \text{formula 1}$$

wherein, x, y, z and w satisfy following relational expressions 2, and 4 to 7, and are values satisfying the expression 3 when a, b, c and d are assumed to be 573, 467, 623 and 736, respectively:

$$x+y+z+w=1 \qquad \text{expression 2}$$

$$600 \leq ax+by+cz+dw \qquad \text{expression 3}$$

$$0 \leq x/(1-w) \leq 0.95 \qquad \text{expression 4}$$

$$0 \leq y/(1-w) \leq 0.4 \qquad \text{expression 5}$$

$$0 < z/(1-w) \leq 0.95 \qquad \text{expression 6}$$

$$0.02 \leq w \leq 0.2 \qquad \text{expression 7.}$$

A luminescent material according to another aspect of the present invention comprises a compound showing an emission band having a peak wavelength of 600 nm or more when it is excited by ultraviolet radiation having a wavelength of 254 nm, and also showing an emission band having a peak wavelength of 600 nm or more even when it is excited by blue light having a wavelength of 460 nm.

A method of manufacturing a europium-activated alkaline earth orthosilicate luminescent material according to one aspect of the present invention comprises:

storing a mixture of raw materials in a vessel;

applying a first sintering to the mixture of the raw materials under a reducing atmosphere of $N_2/H_2$ to obtain a first sintered material;

pulverizing the first sintered material to obtain a pulverized first sintered material;

storing the pulverized first sintered material in a vessel;

placing the vessel storing the pulverized first sintered material in a furnace and substituting a nitrogen gas in the furnace under a reduced pressure; and applying a second sintering to the pulverized first sintered material under a reducing atmosphere of $N_2/H_2$ containing hydrogen at a concentration of 5% or more and less than 100% to obtain a secondary sintered product.

A light-emitting device according to one aspect of the present invention comprises:

a light-emitting element emitting light, the light having a wavelength ranging from 360 to 480 nm; and a luminescent layer comprising a luminescent material configured to be irradiated with the light, at least part of the luminescent material being the above-mentioned europium-activated alkaline earth orthosilicate luminescent material.

A light-emitting device according to another aspect of the present invention comprises:

a light-emitting element emitting light, the light having a wavelength ranging from 360 to 480 nm; and a luminescent layer comprising a luminescent material configured to be irradiated with the light, at least part of the luminescent material being a europium-activated alkaline earth orthosilicate luminescent material having a peak wavelength of 600 nm or more.

DETAILED DESCRIPTION OF THE INVENTION

Next, embodiments will be explained. The embodiments described below are simply examples of the luminescent materials and the light-emitting devices each embodying the technical concept of the present invention, so that the present invention should not be construed as being limited to following embodiments.

Further, the members described in the claims accompanied herewith should not be construed as being limited to those described in the following embodiments. Unless specified otherwise, the dimensions, specific materials, configurations and relative arrangement of the constituent members described in the following embodiments are set forth merely for the purpose of explanation and hence should not be construed as limiting the scope of the present invention. Incidentally, the size and relative position of the members shown in the drawings are exaggerated in some cases for the convenience of explanation. In the following explanations, the same or like members are identified by the same designation or the same symbol, thereby omitting the repetition of detailed explanation thereof. Further, each of elements constituting the present invention may be modified in such a manner that a plurality of elements are integrated using the same and single member to enable this single member to have the functions of the plurality of elements or, to the contrary, the functions of a single member are shared using a plurality of members.

As a result of keen examination, the inventors discovered that optimization of a composition of a europium-activated alkaline earth orthosilicate enables a peak wavelength of 600 nm or more when it is excited by ultraviolet radiation at 254 nm to be obtained. A luminescent material according to the embodiment of the present invention has a composition represented by a following formula 1:

formula 1

In the formula (1) as described above, x, y, z and w satisfy the following relational expressions 2, and 4 to 7, and are values satisfying the expression 3 when it is assumed that a is 573, b is 467, c is 623 and d is 736:

$x+y+z+w=1$  expression 2

$600 \leq ax+by+cz+dw$  expression 3

$0 \leq x/(1-w) \leq 0.95$  expression 4

$0 \leq y/(1-w) \leq 0.4$  expression 5

$0 < z/(1-w) \leq 0.95$  expression 6

$0.02 \leq w \leq 0.2$  expression 7

In an alkaline earth orthosilicate compound, Sr, Ca, and Ba are present in a completely solid solution state. This condition and the mathematical expressions 2, 3, and 7 determine a range of numeric values x, y and z that relate to the metal content of alkaline earths. In other words, the mathematical expressions 4, 5 and 6 are derived by these conditions.

When a value of $x/(1-w)$ or that of $z/(1-w)$ exceeds 0.95, emission having a peak wavelength of 600 nm or more cannot be obtained. In addition, when $z/(1-w)$ is 0, an emission having a peak wavelength of 600 nm cannot be obtained, either. Furthermore, since an emission having a peak wavelength of 600 nm or more cannot be obtained if a value of $y/(1-w)$ exceeds 0.4 as a result of experimentation, the upper limit of $y/(1-w)$ shall be defined as 0.4.

When the content of Eu is less than 0.02 (w<0.02), a composition region showing a peak wavelength of 600 nm or more is narrowed. In addition, the light absorption power of a blue area having a wavelength that ranges 440 nm or more to 480 nm or less is reduced, thereby making it difficult to obtain high luminous efficiency through blue excitation. On the other hand, when a value of w exceeds 0.2, output will fall. More preferably, $0.05 \leq w \leq 0.15$.

Derivation of the above mathematical expression 3 shall be discussed later.

The inventors discovered that a luminescent material having a peak wavelength of 600 nm or more can be obtained by sintering under a thorough reducing atmosphere and defining the composition to a specific range, when a luminescent material of a europium-activated alkaline earth orthosilicate $(Sr_x, Ba_y, Ca_z, Eu_w)_2SiO_4$ is synthesized.

To be more specific, a luminescent material according to the embodiment can be manufactured by the following method. Oxide powder of a constituting element may be used as a starting material. A predetermined oxide powder of a constituting element is weighed, to which an appropriate amount of ammonium chloride is added as a crystal growing agent, and mixed by a ball mill, etc. Various kinds of compounds that can be oxidized by thermal decomposition may be used in place of oxide powder. For instance, $Eu_2O_3$, etc. may be used as Eu raw material, $SrCO_3$, etc. may be used as Sr raw material, $BaCO_3$ may be used as Ba raw material, $CaCO_3$, etc. may be used as Ca raw material, $SiO_2$, etc. may be used as Si raw material, etc.

A crystal growing agent may include ammonium other than ammonium chloride, and chlorides, fluorides, bromides, or iodides of alkali metal, etc. In addition, chlorides, fluorides, bromides or iodides of alkaline earth metals may be used. Preferably, the amount of crystal growing agent to be added shall be 0.01 weight percent or more and 0.3 weight percent or less of the total raw material powder, in order to prevent hygroscopy from increasing.

A primary sintered product is obtained by placing in a vessel such as a crucible the raw material, which is then mixed, and then a heat treatment is performed. The heat treatment takes place in a reducing atmosphere of $N_2/H_2$ or $Ar/H_2$. This is because it not only synthesizes the matrix luminescent material but also promotes reduction of europium in oxides used as raw materials. The temperatures and duration of heat treatment can be 1000° C. to 1500° C. and 3 to 7 hours. Then, the obtained primary sintered product is pulverized and placed in the vessel again. The degree of pulverization is not defined specifically, and the lumps of the primary sintered product may be pulverized by using a mortar, etc., thus increasing the surface area.

The pulverized primary product is placed in a furnace again and substituted by inert gas such as nitrogen or argon under reduced pressure, or vacuum. The reduced pressure is desired to be 1000 Pa or less to adequately remove moisture, oxygen, etc. attached to materials.

Then, the pulverized primary sintered material is subject to a heat treatment in a reducing atmosphere of $N_2/H_2$ or $Ar/H_2$ to obtain a secondary sintered product. The temperature and duration of the heat treatment can be set to 1000 to 1500° C. or lower and 2 to 6 hours. In the sintering, it is specified that the concentration of hydrogen in the atmosphere be 5% or more and less than 100%. If the hydrogen concentration is less than 5%, reduction from $Eu^{3+}$ to $Eu^{2+}$ will be imperfect, thus reducing emission intensity. Performing a heat treatment twice in a predetermined reducing atmosphere almost completely reduces $Eu^{3+}$ in a luminescent material, thus substantially leaving only $Eu^{2+}$.

In the method of the embodiment, the step substituting a nitrogen gas in the furnace under a reduced pressure should be understood as follows. In order to sufficiently remove moisture and oxygen from the closed-type electric furnace, the pressure in the furnace is reduced to not more than 1000 Pa. Then, a reducing atmosphere of $N_2/H_2$ or $Ar/H_2$ which contains hydrogen at 5% or more and less than 100% is introduced in the furnace. The reducing pressure and introducing atmosphere described above is performed at least one time, thereby, substituting in the furnace thorough reducing atmosphere.

In the manufacture of conventional europium-activated alkaline earth luminescent material, a heat treatment is executed in an atmosphere having a hydrogen concentration of less than 5% in an open type electric furnace. It is presumed that one of the reasons for having not been able to obtain sufficient emission intensity with the conventional europium-activated alkaline earth luminescent material is the insufficient reducing atmosphere. On the other hand, in the embodiment, a luminescent material is manufactured by applying sintering in an atmosphere that has a high hydrogen concentration of 5% or more and that is formed by filling the evacuated furnace with a reducing atmosphere comprised of a mixture of $N_2/H_2$ or $Ar/H_2$. Due to sintering in such an atmosphere, it has become possible to obtain an europium-activated alkaline earth luminescent material that contains Eu in dramatically larger quantities than obtained conventionally.

First of all, in the conventional method, raw powder is sintered in a simple reducing atmosphere to manufacture $(Sr_x, Ba_y, Ca_z, Eu_w)_2SiO_4$ luminescent material. With the Eu concentration fixed to w=0.01, a luminescent material of Sr—Ca series (y=0), Ca—Ba (x=0) series and Ba—Sr (z=0) series of a binary system is fabricated. When the composition ratio difference of alkaline earth elements in a respective series is set at 10%, a light-emitting property upon excitation at 254 nm was shown. This result agreed with the values in the literature references.

In the Sr—Ca series among the series tested, the longest emission peak wavelength was obtained closest to the long wavelength, the peak wavelength being 598 nm. In the Sr—Ca series, if the value of z is increased from 0 (if Ca content is increased), the peak wavelength rises, reaching 598 nm at around z/(1−w)=0.4. It was confirmed, however, that the peak wavelength decreases when z exceeds this, falling to 510 nm at z/(1−w)=1.

Figure 1:
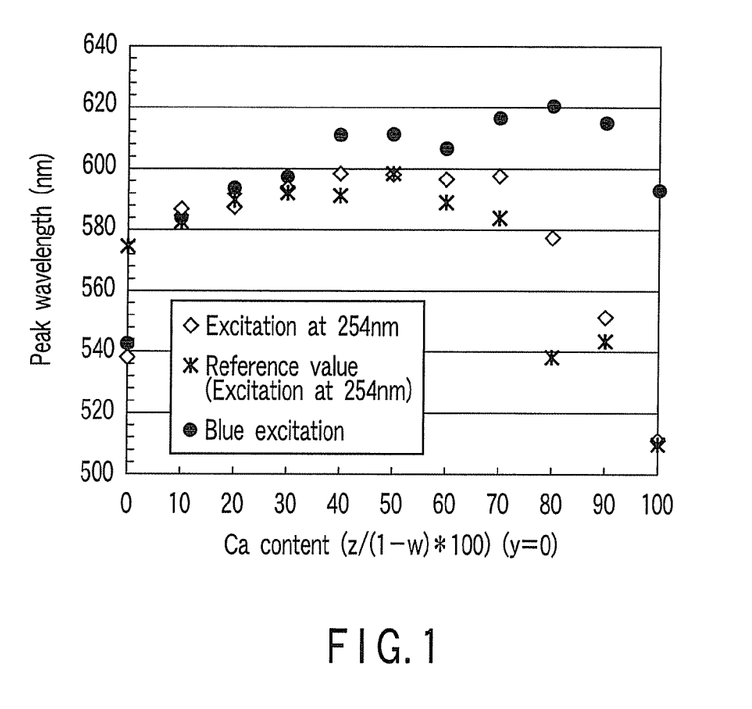
FIG. 1 is a graph chart representative of a relationship of composition z and peak wavelength in Ca—Sr binary system.

FIG. 1 shows a relationship of a value of z (Ca content) in a luminescent material of Sr—Ca binary system and a peak wavelength. In FIG. 1, data points shown by "excited at 254 nm" refer to the peak wavelength when $(Sr_x, Ca_z)_2SiO_4$:Eu luminescent material is excited by light having a wavelength of 254 nm with the Eu concentration fixed at w=0.01, while data points shown by "reference value (excited at 254 nm)" refer to the value of a peak wavelength of $(Sr_x, Ca_z)_2SiO_4$ Eu luminescent material excited by light having a wavelength of 254 nm described in the non-patent reference (T. L. Barry, Journal of Electrochemical Society Vol. 115, No. 11, pp. 1181-1184 (1968)). In addition, data points shown by "BLUE excitation" refer to the peak wavelength when $(Sr_x, Ca_z)_2SiO_4$:Eu luminescent material is excited by blue light having a wavelength of 460 nm with the Eu concentration fixed to w=0.01.

Figure 2:
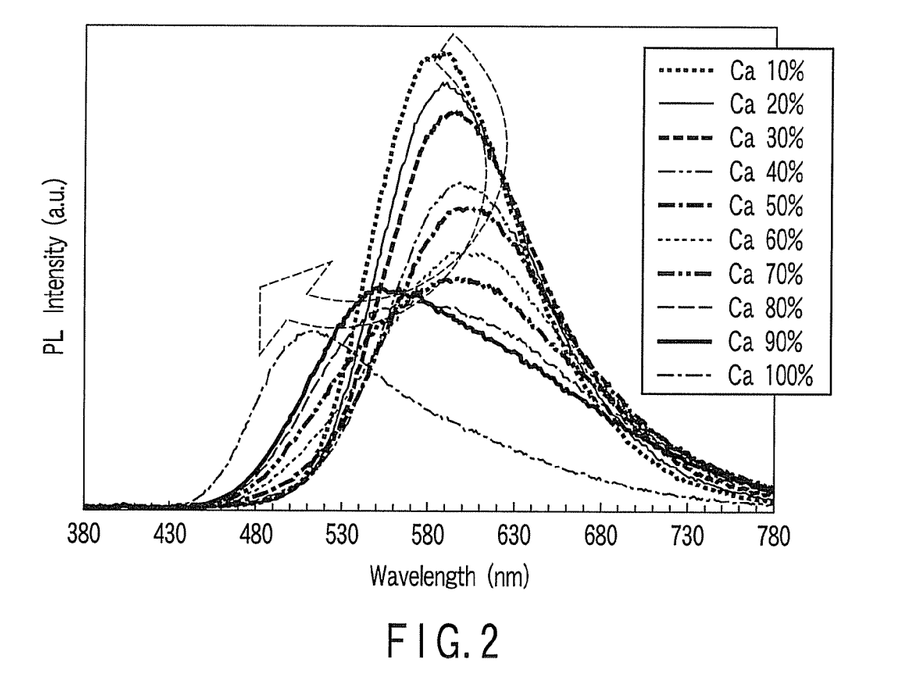
FIG. 2 is an emission spectrum of a conventional luminescent material excited at 254 nm.

FIG. 2 shows an emission spectrum upon excitation by light having a wavelength of 254 nm, by changing the Ca content z of $(Sr_x, Ca_z)_2SiO_4$:Eu luminescent material with an Eu concentration fixed at w=0.01. As shown in the figure, the emission peak appears in the proximity of 587 nm when the Ca content z/(1−w) is 10%. The emission peak shifts to the long wavelength side as the Ca content z increases. If the Ca content z further increases, it then shifts to the reverse short wavelength side. When the Ca content z/(1−w) is 100%, the emission peak appears in the proximity of 511 nm.

Figure 3:
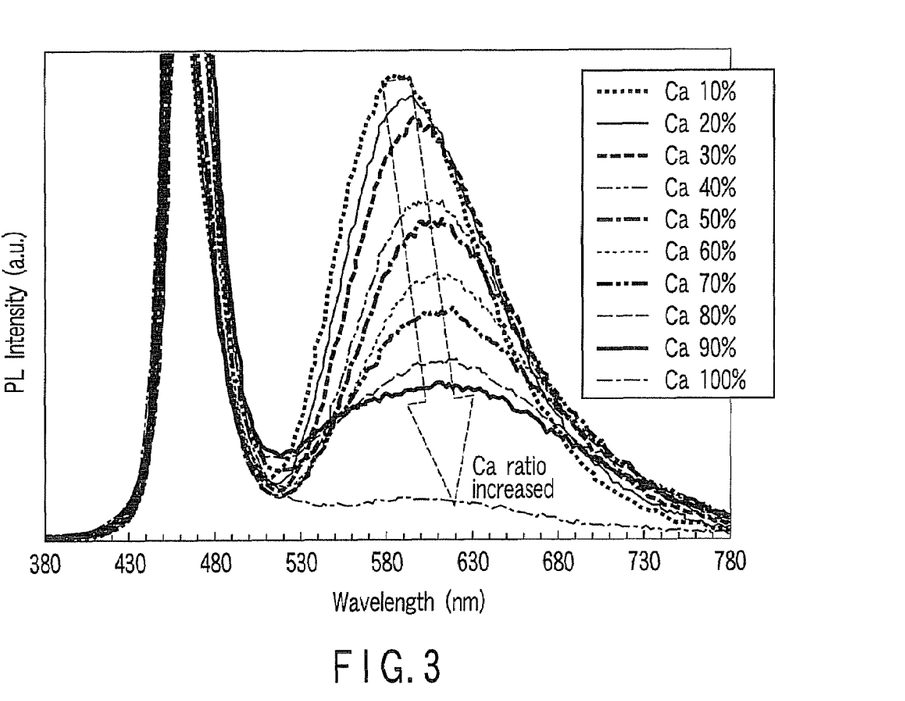
FIG. 3 is an emission spectrum of a conventional luminescent material excited at 460 nm.

In addition, FIG. 3 shows an emission spectrum upon excitation by light having a wavelength of 460 nm, by changing the Ca content z of $(Sr_x, Ca_z)_2SiO_4$:Eu luminescent material with the Eu concentration fixed to w=0.01. As shown in the figure, the emission peak appears in the proximity of 584 nm when Ca is 10%. The emission peak monotonically shifts to the proximity of z/(1−w)=0.9, on the long wavelength side as the Ca content z increases, and then shifts to the short wavelength side. If the Ca content z/(1−w) is 90%, the emission peak appears in the proximity of 616 nm. If the Ca content z/(1−w) is 100%, the emission peak appears in the proximity of 590 nm.

The following can be understood from FIG. 1, FIG. 2 and FIG. 3: for a $(Sr_x, Ca_z)_2SiO_4$:Eu luminescent material with an Eu concentration fixed at w=0.01, similarly to the non-patent reference, the peak wavelength increases upon excitation by ultraviolet radiation of 254 nm. However, the peak wavelength will not be a long wavelength of 600 nm or more, and the peak wavelength becomes shorter, in the proximity of z/(1−w)=0.7. However, upon excitation by blue light having a wavelength of 460 nm, if the z value is increased, the peak wavelength increases, exceeding 600 nm or more and becomes a longer wavelength in the proximity of z/(1−w)=0.9.

The inventors discovered the following regarding the Sr—Ca luminescent material of the binary system that was further tested: the emission peak wavelength upon excitation by blue light having a wavelength ranging from 440 to 480 nm changes to a longer wavelength of 600 nm or more, depending on the z value.

When it is smaller than z/(1−w)=0.4, the emission peak appears at the same wavelength as the excitation at 254 nm. However, when it exceeds z/(1−w)=0.4 or more, the emission peak appeared closer to the long wavelength side more than 600 nm, unlike the excitation at 254 nm.

Also, when a similar luminescent material is excited by near-ultraviolet radiation to violet light having a wavelength that ranges from 360 nm or more to 440 nm or less, the tendency similar to the case of blue excitation can be observed, although the degree is smaller. The emission peak wavelength shifted to the long wavelength side compared with the excitation at 254 nm. The half bandwidth of the emission spectrum band to be obtained by being excited by light in the wavelength region of 360 to 480 nm becomes smaller than the in case of excitation at 254 nm. The inventors discovered this phenomenon.

In general, it is known that a position of the peak wavelength of the luminescent material having $Eu^{2+}$ as an emission center element changes, the $Eu^{2+}$ position in the crystal lattice being largely affected by an electric field received from surrounding negative ions. For the $(Sr_x, Ba_y, Ca_z, Eu_w)_2SiO_4$ luminescent material as well, the emission wavelength changes due to the composition of alkaline earth metals. It is construed that this is caused by the size of the crystal lattice of mixed crystals being changed due to the composition, thus the change in the electric field at the $Eu^{2+}$ position. An ion radius of alkaline earth metals is reduced from Ba to Sr, further to Ca, size of the crystal lattice is reduced in this order. In fact, the electric field at the $Eu^{2+}$ position is enhanced in this order, and consequently, the emission peak wavelength shifts to the long wavelength side.

It was confirmed through actual measurements that in the Sr—Ba binary system luminescent material that does not contain Ca, the lattice constant decreases as Sr content x increase, and the emission wavelength continuously changes from 505 nm to 580 nm. However, for the Ca—Sr binary system luminescent material, the peak wavelength at $z/(1-w) > 0.4$ appeared on the short wavelength side rather than at the longest value of 598 nm, although the lattice constant monotonically decreases as z increases.

Figure 4:
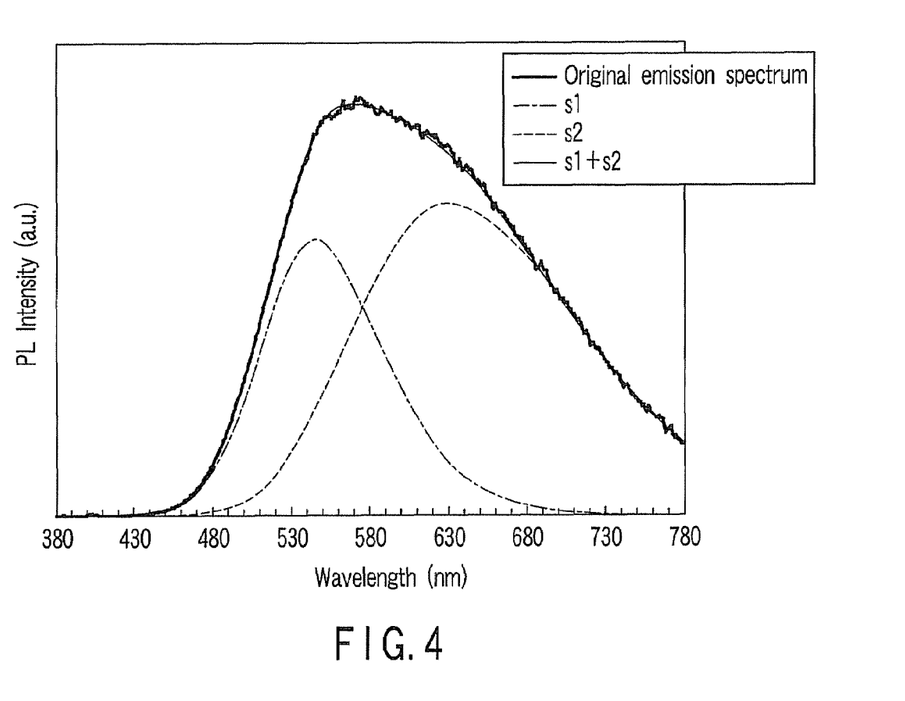
FIG. 4 is result of separation into 2 kinds of spectra of an emission spectrum obtained through excitation at 254 nm.

Thus, the emission band obtained by exciting a $z/(1-w) > 0.4$ sample $(x/(1-w):z/(1-w)=0.1:0.9)$ by light having a wavelength of 254 nm when the Eu concentration is $w=0.01$ was next analyzed. FIG. 4 shows the result of the spectrum analysis of this emission band. The emission band obtained by excitation at 254 nm has the peak wavelength in the proximity of 550 nm. It is clearly indicated that this peak wavelength is configured of an overlap of two emission bands: a short wavelength band (S1) in the vicinity of 546 nm and a wavelength band (S2) longer than 600 nm.

The following was concluded from the above. In fact, when excited by ultraviolet radiation having a peak at 254 nm, the two bands are overlapped, the shorter wavelength band becoming stronger, and the peak wavelength being shorter. On the one hand, if they are excited by a longer excitation wavelength, for instance, 360 to 440 nm, the intensity of the short wavelength band will be weaker. If the excitation wavelength further becomes longer, to a wavelength of 440 to 480 nm, emission of the short wavelength ceases and only the long wavelength remains. As a result, the peak wavelength will be longer.

Also, the peak wavelength in the longer wavelength band monotonically increased at $z/(1-w) \geq 0.4$, as the Ca content z increased. The relationship between such an emission band and Ca content is similar to the relationship between Sr—Ba binary system luminescent materials or the relationship supposed to be present due to changes in the lattice constant of the Sr—Ca binary system luminescent material. In other words, similarly to the case of the Ba—Sr system, $Eu^{2+}$ is the cause of the longer wavelength band located at a so-called "normal crystal lattice position". On the one hand, it is believed that the short wavelength band to be seen at $z/(1-w) \geq 0.4$ upon excitation at 254 nm is attributed to $Eu^{2+}$, which is located at the so-called "abnormal crystal lattice position".

In a Sr—Ca binary system luminescent material fabricated by the conventional method, when z approaches 1 at $z/(1-w) > 0.95$, the emission strength of a long wavelength band becomes too low, thus cannot be use for a white LED.

It was also realized that the luminescent material manufactured by a thorough reduction method will show different results in the following points. In other words, in the luminescent material obtained by performing thorough reduction, the emission spectrum excited at 254 nm is similar to that excited at 460 nm even in the region of $z/(1-w) \geq 0.4$, and thus not a shorter wavelength band but only a longer wavelength band appears.

To date, no $(Sr_x, Ba_y, Ca_z, Eu_w)_2SiO_4$ exhibiting a peak wavelength of 600 nm or more when excited at 254 nm has been reported. The fact that the long wavelength band of this new luminescent material was excited at 460 nm confirms that the luminance efficiency of this material is considerably higher than that of those manufactured by the conventional method.

By finely changing compositions x, y, z and w of a luminescent material, a composition region is determined a peak wavelength of which is 600 nm or more when the luminescent material is excited at 254 nm. The peak wavelength was less than 600 nm at $z/(1-w) > 0.95$. In addition, at $x/(1-w) > 0.95$, the luminance efficiency usable as white LED could not be obtained. These regions are regions having a composition closer to $Sr_2SiO_4$ and $Ca_2SiO_4$ single phase, respectively. The region close to $Sr_2SiO_4$ is related to a phase transition in which a crystalline structure changes. Further, the region closer to $Ca_2SiO_4$ is presumably related to a difference between a crystalline structure of a single phase and that of a mixed crystal. In either composition, the luminance peak of 600 nm upon excitation by light of 254 nm cannot be obtained.

When the Eu content was less than 0.02, light absorption was weak in the regions of 360 to 440 nm and 440 to 480 nm, and the luminance efficiency was insufficient for a white LED. Thus, fabricated were luminescent materials of 60 or more types of compositions, excluding the region of $0.02 < w$, $z/(1-w) > 0.95$ and the region of $x/(1-w) > 0.95$, and the light-emitting properties thereof were analyzed. To be more specific, analysis was performed by measuring emission spectra, measuring emission peak positions and emission intensities, and determining the peak intensity that has a peak position of 600 nm or more and can be put to practical use. Consequently, the emission peak wavelength L (nm) could be approximated with high precision by linear functions of contents of respective constituent elements x, y, z and w of Sr, Ba, Ca and Eu. This linear equation may be expressed by the following mathematical expression 8:

$$L = ax + by + cz + dw \qquad \text{expression 8}$$

wherein the composition of synthesized luminescent materials and data on the measured emission spectra are determined by the least-squares approach, leading to $a=573$, $b=467$, $c=623$, and $d=736$, respectively.

As the luminescent material according to the embodiment has a peak wavelength of 600 nm or more, L is 600, and thus the following mathematical expression 3 is derived:

$$600 \leq ax + by + cz + dw \qquad \text{expression 3}$$

Figure 5:
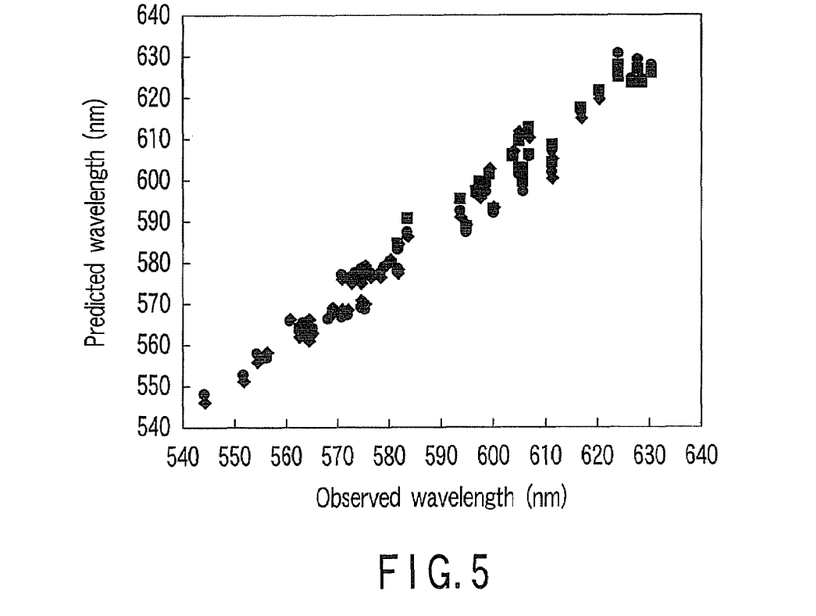
FIG. 5 is a relation between observed values and predicted values to be determined from a linear function expression (8).

FIG. 5 shows a relationship between observed values and predicted values to be determined with the expression 8 given above. The standard deviation in this plot was 3.58. From this, it can be seen that there is no big difference between the emission predictive peak wavelength to be derived by the expression 3 and the observed peak wavelength. It is also possible to determine a composition range of a europium-activated alkaline earth orthosilicate luminescent material $(Sr_x, Ba_y, Ca_z, Eu_w)_2SiO_4$ according to the embodiment, which can be obtained from the expression 3.

Figure 6:
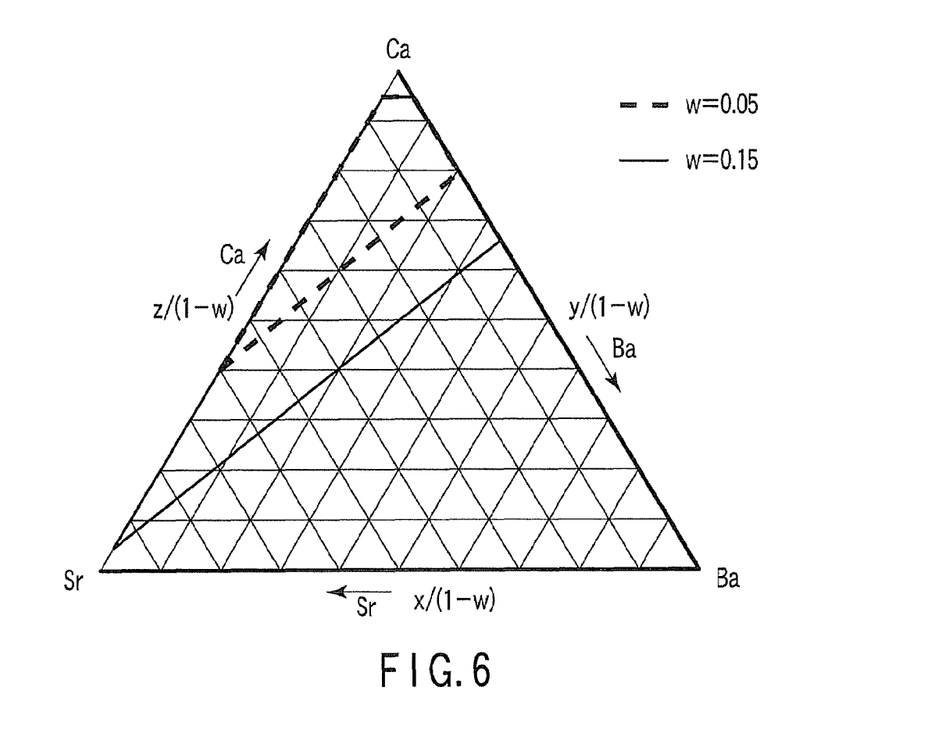
FIG. 6 is a composition range of a luminescent material according to the embodiment.

To clarify the composition range according to the embodiment, FIG. 6 shows the desirable composition range having peak wavelength of 600 nm or more on a tertiary composition diagram comprised of alkaline earth metals. As shown, the composition range of alkaline earth metals varies depending on the value of the Eu content w. When w is 0.05, the composition range is a region where there is more Ca than the line connecting the point (0, 0.2, 0.8) and the point (0.6, 0, 0.4) of (x/(1−w), y/(1−w), z/(1−w)) coordinates representative of a composition ratio of (Sr, Ba, Ca) on the diagram, and where z/(1−w)>0.95 is excluded. As w increases, the composition range expands. When w is 0.15, it is a region where there is more Ca than the line connecting the point of (0, 0.34, 0.66) and the point of (0.95, 0, 0.05), and where z/(1−w)>0.95 is excluded.

As described above, since the composition range of alkaline earth metals is widely influenced by Eu content w, the emission peak wavelength will be the longer wavelength when w is high even if alkaline earths have identical compositions. In the conventionally reported example, the Eu content is fixed, otherwise a luminescent material manufactured by the conventional method will undergo concentration quenching and a considerable reduction in the luminance efficiency when w exceeds 0.05. It was assumed from the above that the effect of the Eu content had not been researched thoroughly enough. In the luminescent material manufactured by the method according to the embodiment, the value of w is defined within $0.02 \leq w \leq 0.2$. Within this range, the luminescent material could be put into practical use because it has sufficient emission intensity even in a peak wavelength beyond 600 nm, when it is excited by light having a wavelength of 254 nm. Yet, it can obtain adequately high luminance efficiency for a white LED.

The following reasons are given as to why the emission peak wavelength shifts to the long wavelength side as Eu content w increases. One is that energy transfer among $Eu^{2+}$ easily occurs, thereby leading to longer wavelength, self-absorption of light emission occurs as light absorption on the shorter wavelength side of an emission band may be intensified, and interaction other than electric fields with $Eu^{2+}$ and surrounding negative ions enter the crystal, etc.

Reasons for why a short wavelength emission band is seen in a luminescent material by the conventional manufacturing method are not yet known, except for $Eu^{2+}$ being located at an "abnormal lattice position" instead of at a so-called "normal crystal lattice position". It was presumed, however, that they may be related to an insufficient reduction from $Eu^{3+}$ to $Eu^{2+}$ of raw material due to a difference in manufacturing methods, or adsorbed moisture. For instance, there may exist an abnormal lattice position of $Eu^{2+}$ due to a presence of $Eu^{3+}$ resulting from an insufficient reduction when the Ca content increases in a Ca—Sr series luminescent material. In the embodiment, since substitution to a reducing atmosphere containing hydrogen at a predetermined concentration takes place after a reduced pressure is obtained, there is a thorough reducing atmosphere. This is because it was presumed that an insufficient reduction to $Eu^{2+}$, i.e., $Eu^{3+}$ has almost disappeared.

The luminescent material according to the embodiment has light emission in a red to orange region with a peak wavelength of 600 nm or more. Preferably, this luminescent material is used to obtain a light-emitting device in combination with a blue-emitting diode (LED or laser diode) having an emission peak in a blue region as a light source having a wavelength of 440 nm or more and 480 nm or less. In addition, it may be preferably used in a light-emitting device that uses, as a light source, near-ultraviolet radiation to violet light with a wavelength of 360 to 440 nm.

In particular, it is preferred as a red component luminescent material when it is mixed with a luminescent material having a peak wavelength of 600 nm or less to fabricate a white light-emitting LED with a low color temperature. To be more specific, a white light-emitting LED with a low color temperature can be obtained when the luminescent material according to the embodiment is used by being mixed with a green light-emitting luminescent material, a yellow light-emitting luminescent material, and blue light-emitting luminescent material.

As a green or yellow light-emitting luminescent material are listed as a YAG:Ce series luminescent material, Ca-α-SiAlON series luminescent material, $SrSiO_2N_2$:Eu series luminescent material, $BaMgAl_{10}O_{17}$:Eu, Mn luminescent material, $(Sr, Ba, Ca, Eu)_2SiO_4$ series luminescent material, ZnS series luminescent material, etc. As a blue light-emitting device luminescent material, a $BaMgAl_{10}O_{17}$:Eu luminescent material or a $(Ca, Sr, Ba)_5(PO_4)_3Cl$:Eu, etc. may be used.

In a LED that uses a blue light-emitting diode as a light source and comprises application of a YAG:Ce luminescent material and the luminescent material according to the embodiment, for instance, white can be obtained as follows. First, blue light is emitted from a light-emitting diode. To this are added not only yellow light of the excited YAG:Ce series luminescent material but also red light of the luminescent material according to the embodiment that has been excited by blue light. Consequently, white light with a low color temperature can be obtained. The color rendering evaluation number defined by CIE as color rendering index Ra that represents naturalness of light emission as a light-emitting source is therefore considerably improved. In particular, the color rendering evaluation number for red and human skin R9 and R15 are improved. Such improvement is attributed to a europium-activated alkaline earth orthosilicate luminescent material $(Sr_x, Ba_y, Ca_z, Eu_w)_2SiO_4$ according to the embodiment that has been mixed as light emission of a red to orange component.

The color rendering properties are employed to make a comparison of light sources having the same color temperatures, as black-body radiation with the same color temperatures is considered a standard. In addition, when near-ultraviolet radiation to violet light having a wavelength of 360 nm to 440 nm is used as a light source, and a $BaMgAl_{10}O_{17}$:Eu luminescent material, a Ca-α-SiAlON series luminescent material, and a luminescent material according to the embodiment are mixed and applied, white light with a low color temperature can be obtained through synthesis of blue light, yellow light and red light that are emitted from the respective luminescent materials. In particular, when a europium-activated alkaline earth orthosilicate luminescent material having an emission peak wavelength of 600 nm or less is used as a green light-emitting component or a yellow light-emitting component, a white LED with better performance can be fabricated more easily. In other words, it is the luminescent material of the $(Sr, Ba, Ca, Eu)_2SiO_4$ series.

The surface of a green light-emitting luminescent material or yellow light-emitting luminescent material have similar particle configurations or chemical or physical properties to those of a red light-emitting luminescent material $(Sr_x, Ba_y, Ca_z, Eu_w)_2SiO_4$, although they have different compositions. This is because they can be uniformly mixed in epoxy resin or silicone resin when a mixture with the luminescent material according to the embodiment is prepared. In addition, as they have similar physical or chemical properties although they have different light-emitting colors, they can be manufactured using standard manufacturing processes. For instance, a standard electric furnace or a crucible for sintering and washing or sorting processes can be used. In addition, a europium-activated alkaline earth orthosilicate luminescent material has a lower sintering temperature than a YAG series or nitride series, thereby leading to reduced manufacturing cost.

Preferably, a mixed luminescent material is comprised of only $(Sr_x, Ba_y, Ca_z, Eu_w)_2SiO_4$ series luminescent materials. Since these luminescent materials can be efficiently excited by light having a wavelength ranging from 360 to 480 nm, a white LED with better color rendering properties can be fabricated without relying on a light source. To be more specific, even for a blue light-emitting LED light source having a wavelength of 440 nm or more and 480 nm or less, or even for an LED light source emitting near-ultraviolet radiation to violet light having a wavelength of 360 to 440 nm, a white LED with similar better color rendering properties can be obtained.

In addition, when prevention of moisture is needed, a surface layer material may be applied to a surface of particles of the luminescent material, the surface layer material being comprised of at least one selected from the group consisting of silicone resin, epoxy resin, fluorine resin, tetraethoxysilane (TEOS), silica, zinc silicate, aluminum silicate, calcium polyphosphate, silicone oil, and silicon grease. Zinc silicate and aluminum silicate are expressed by $ZnO \cdot cSiO_2 (1 \leq c \leq 4)$ and $Al_2O_3 \cdot dSiO_2 (1 \leq d \leq 10)$, respectively. The surface of the particles of the luminescent materials should not be completely covered with the surface layer material, and a part thereof may also be exposed. If the surface layer material comprised of materials as described above is present on the surface of particles of luminescent material, the effect thereof can be achieved. The surface layer material can be arranged on the surface of particles of luminescent material by using a dispersion liquid or solution thereof. After the particles are immersed in the dispersion liquid or solution thereof for a predetermined period of time, the surface layer material can be arranged by drying through heating, etc. Preferably, the surface layer material exists at a proportion of volume of approximately 0.1 to 5% of the particles of the luminescent material, in order to achieve the effects of the surface layer material without impairing inherent functions as a luminescent material.

Figure 7:
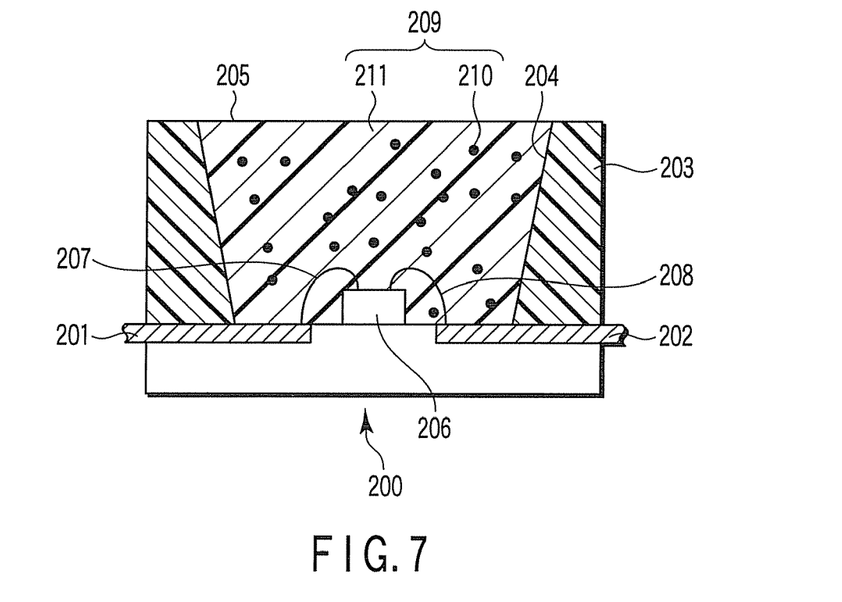
FIG. 7 is a cross sectional view of a light-emitting device according to the embodiment.

FIG. 7 shows a cross section of a light-emitting device according to one embodiment.

In the light-emitting device as shown, a resin stem 200 has a lead 201 and a lead 202 comprising a molded lead frame, and a resin section 203 integrally molded therein. The resin section 203 has a recess 205 an upper opening of which is wider than the base, and a reflecting surface 204 is provided on the side of this recess.

To a central part of the almost circular base of the recess 205 is mounted a light-emitting chip 206 by Ag paste, etc. As a light-emitting chip 206, one that emits light of a wavelength region of 360 nm or more and 480 nm or less is used, such as a light-emitting diode, laser diode, etc. Furthermore, one capable of ultraviolet emission may also be used, and shall not be limited specifically. A light-emitting chip that can emit blue light or blue-purple light, near-ultraviolet radiation, etc. may also be used, in addition to the ultraviolet light. For instance, a semiconductor light emitting device, etc., such as a GaN series, may be used. Electrodes of the light-emitting chip 206 (not shown) are connected to the lead 201 and the lead 202, respectively, by bonding wire 207 and 208 comprised of Au, etc. The arrangement of the lead 201 and 202 may be changed, as appropriate.

A luminescent layer 209 is arranged in the recess 205 of the resin section 203. The luminescent layer 209 can be formed by dispersing or settling the luminescent material 210 at 5 weight % to 50 weight % in the resin layer 211 comprised of silicone resin, for instance.

In the light-emitting device according to one embodiment, at least a part of the luminescent material 210 is a europium-activated alkaline earth orthosilicate luminescent material having the composition shown by said formula 1. The luminescent material 210 may contain a luminescent material having a peak wavelength shorter than 600 nm. In this case, a luminescent material having a peak wavelength shorter than 600 nm is preferably a europium-activated alkaline earth orthosilicate luminescent material.

Alternatively, at least a part of the luminescent material 210 may be a europium-activated alkaline earth orthosilicate luminescent material having a peak wavelength of 600 nm or more. The inventors discovered that a luminescent material that cannot have a peak wavelength of 600 nm or more upon excitation at 254 nm can obtain the peak wavelength of 600 nm or more by being excited by light having an appropriate wavelength. To be more specific, this is the case in which a blue LED having a peak wavelength at 460 nm or a near-ultraviolet LED having a peak wavelength at 393 nm is used as a light source. In this case as well, similarly to the above, a luminescent material having a peak wavelength shorter than 600 nm can be further contained as the luminescent material 210, and preferably, said luminescent material is a europium-activated alkaline earth orthosilicate luminescent material.

As a light-emitting chip 206, a flip chip type having an n-type electrode and a p-type electrode in the same plane can also be used. In this case, possible problems resulting from wire such as disconnection or detachment of wire, or light absorption by wire, etc. can be avoided, thus a reliable semiconductor light-emitting device with high intensity can be acquired. In addition, use of an n-type substrate for the light-emitting chip 206 enables the configuration as described below. To be more specific, an n-type electrode is formed on the backside of the n-type substrate, a p-type electrode is formed on a top surface of a semiconductor layer on the substrate, and either the n-type or p-type electrode is mounted to the lead. The p-type or n-type electrode can be connected to other leads by wire. The size of the light-emitting chip 206, and dimensions and shape of the recess 205 may be changed, as appropriate.

In the following, although this invention is described in more detail by showing the embodiments and comparative examples, the present invention shall not be limited to the following embodiments as far as it does not deviate from its spirit.

(Luminescent Material No. 1)

A luminescent material was prepared having a composition expressed by $(Sr_{0.63} Ca_{0.27} Eu_{0.10})_2SiO_4$. As a raw powder, 37.20 g of $SrCO_3$ powder, 10.81 g of $CaCO_3$ powder, 11.78 g of $SiO_2$ powder, and 7.04 g of $Eu_2O_3$ powder were prepared. In addition, as a crystal growing agent, 2.00 g of $NH_4Cl$ was added thereto and was uniformly mixed by a ball milling.

After the obtained mixed raw materials were placed in a crucible, they were sintered under the following sintering conditions. First of all, under a reducing atmosphere of $N_2/H_2$, a first sintering was applied at 1000 to 1500° C. for 3 to 7 hours to obtain a primary sintered product. Then, the primary sintered product was pulverized, placed back in the crucible, and then placed in the furnace, and substituted a nitrogen gas in the furnace under vacuum. A second sintering was applied under a reducing atmosphere of $N_2/H_2$ containing hydrogen at a concentration of 5% or more and less than 100% at 1000 to 1500° C. for 2 to 6 hours, to obtain a secondary sintered product.

Then, after pulverizing and screening the obtained secondary sintered product in water, it was dehydrated through suction filtration. Lastly, it was dried at 150° C. in a drier, and further screened to obtain No. 1 luminescent material.

Figure 8:
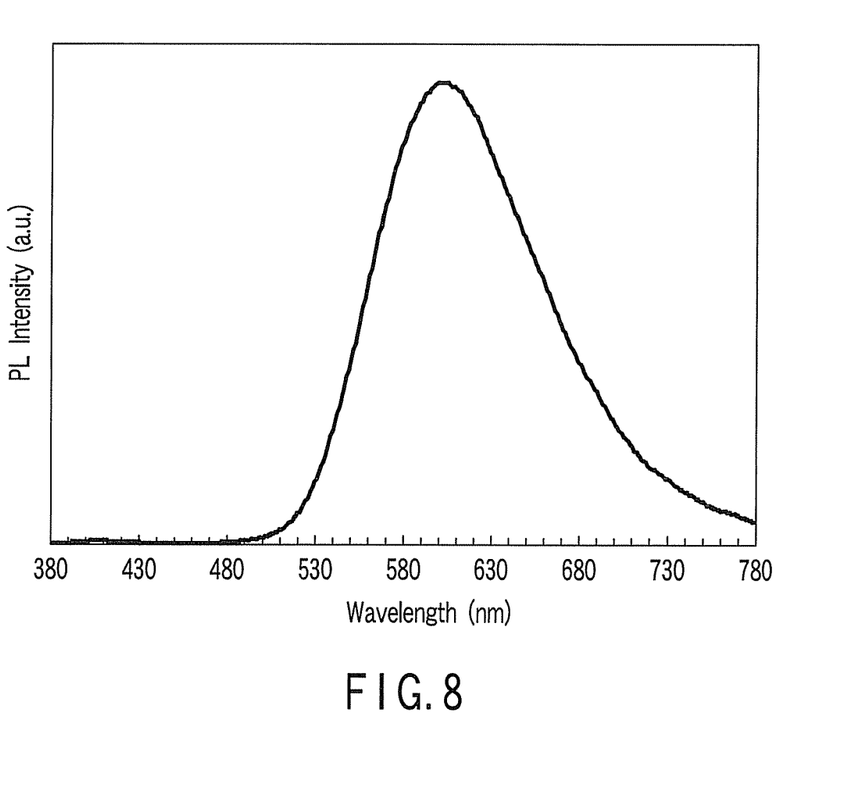
FIG. 8 is an emission spectrum of a luminescent material according to the embodiment.

The obtained luminescent material was excited by ultraviolet radiation having a peak wavelength at 254 nm, to measure an emission spectrum. FIG. 8 shows the result. An IMUC-7000G type instantaneous multi-photometry system, manufactured by OTSUKA ELECTRONICS CO., LTD., was used for measurement of the emission spectrum. When $(Sr_{0.76}, Ca_{0.19}, Eu_{0.05})_2SiO_4$ luminescent material was used as a tentative standard, the peak intensity ratio of the obtained phosphor relative to that of the $(Sr_{0.76}, Ca_{0.19}, Eu_{0.05})_2SiO_4$ luminescent material was 0.75.

The luminescent material in this embodiment exhibited the emission spectrum of almost same shape as the emission spectrum of FIG. 8 even when it was excited by light from a blue LED source having a peak wavelength of 460 nm. The peak wavelength was 606 nm, and when compared with the peak intensity of a tentative standard, $(Sr_{0.52}, Ca_{0.43}, Eu_{0.05})_2$ SiO$_4$ luminescent material, excited at 460 nm, the peak intensity ratio turned out to be 1.22.

Table 1 below summarizes the peak wavelengths and peak intensities of No. 1 luminescent material. Table 1 also shows wavelength predicted from the equation 3.

(Luminescent Material No. 2)

Fabricated was a luminescent material having a composition expressed by $(Sr_{0.72} Ca_{0.18} Eu_{0.10})_2SiO_4$ by a method similar to that of No. 1 luminescent material, except for changing the mixed composition of the raw powder. This material was labeled as No. 2.

Figure 9:
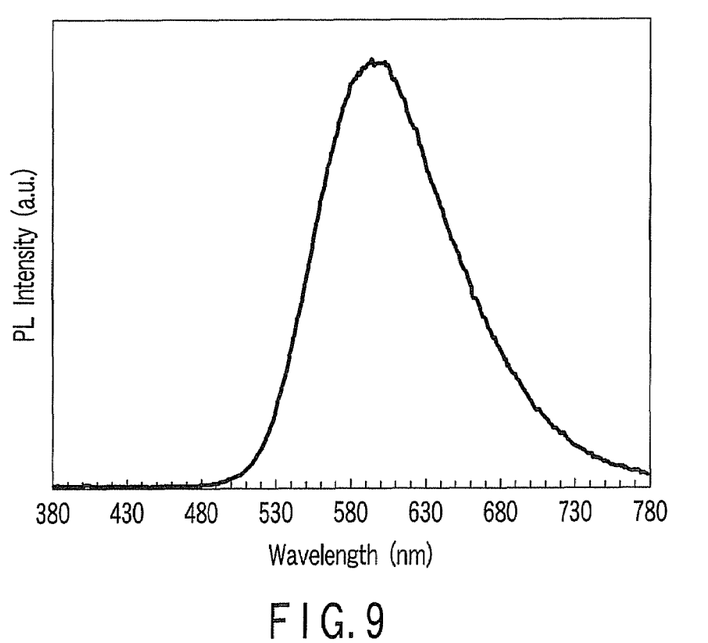
FIG. 9 is an emission spectrum of a luminescent material of a comparative example.

The obtained luminescent material was excited by ultraviolet radiation having a peak wavelength at 254 nm, and an emission spectrum was measured. FIG. 9 shows the result. The emission spectrum had a peak wavelength of 595 nm. As a result of analyzing the emission spectrum of $(Sr_{0.72} Ca_{0.18} Eu_{0.10})_2SiO_4$ excited at 254 nm, it was determined that this spectrum was comprised of 2 bands of the peak wavelengths of 590 nm and 625 nm.

When this luminescent material was excited at 460 nm, it showed orange light emission having a peak wavelength of 602 nm.

(Luminescent Material No. 3)

No. 3 luminescent material was fabricated by a similar method to that of No. 1 luminescent material, except that second sintering was not applied. When the obtained luminescent material was excited by ultraviolet radiation having a peak wavelength at 254 nm, the peak wavelength of the emission spectrum was 603 nm. However, the peak intensity of the emission spectrum of No. 3 luminescent material only had an intensity ratio of approximately 3% of the No. 1 luminescent material to which the second sintering was applied, thus it was not suitable for practical use.

No. 4 to No. 17 luminescent materials were further fabricated by a similar method to that of No. 1 luminescent material, except that the mixed composition of raw materials was changed so as to achieve the element contents shown in the Table 1 below. Peak wavelengths and peak intensity ratios of the obtained luminescent materials were examined, by performing excitation by ultraviolet radiation at 254 nm and that by blue LED, as described above. Table 1 below summarizes the result together with predicted wavelength.

TABLE 1

| No. | Sr (x) | Ba (y) | Ca (z) | Eu (w) | Blue-LED excitation | | Excitation at 254 nm | | Predicted wavelength |
|---|---|---|---|---|---|---|---|---|---|
| | | | | | Wavelength (nm) | Peak intensity ratio | Wavelength (nm) | Peak intensity ratio | |
| 1 | 0.63 | 0.00 | 0.27 | 0.10 | 606 | 1.22 | 601 | 0.75 | 602 |
| 2 | 0.72 | 0.00 | 0.18 | 0.10 | 602 | 1.46 | 595 | 0.89 | 598 |
| 3 | 0.63 | 0.00 | 0.27 | 0.10 | 535 | 0.04 | 603 | 0.02 | 602 |
| 4 | 0.18 | 0.00 | 0.72 | 0.10 | 626 | 0.62 | 619 | 0.50 | 625 |
| 5 | 0.36 | 0.18 | 0.45 | 0.10 | 600 | 0.94 | 606 | 0.62 | 601 |
| 6 | 0.27 | 0.18 | 0.54 | 0.10 | 604 | 0.81 | 606 | 0.53 | 606 |
| 7 | 0.18 | 0.18 | 0.63 | 0.10 | 605 | 0.70 | 606 | 0.44 | 611 |
| 8 | 0.66 | 0.00 | 0.29 | 0.05 | 606 | 1.20 | 597 | 0.88 | 597 |
| 9 | 0.57 | 0.00 | 0.38 | 0.05 | 611 | 1.02 | 607 | 0.76 | 602 |
| 10 | 0.47 | 0.00 | 0.48 | 0.05 | 611 | 0.97 | 603 | 0.70 | 607 |
| 11 | 0.38 | 0.00 | 0.57 | 0.05 | 606 | 0.80 | 615 | 0.60 | 612 |
| 12 | 0.29 | 0.00 | 0.66 | 0.05 | 616 | 0.70 | 611 | 0.54 | 617 |
| 13 | 0.17 | 0.00 | 0.70 | 0.13 | 624 | 0.56 | 623 | 0.48 | 626 |
| 14 | 0.59 | 0.00 | 0.26 | 0.15 | 606 | 1.21 | 606 | 0.72 | 606 |
| 15 | 0.17 | 0.00 | 0.68 | 0.15 | 630 | 0.49 | 626 | 0.40 | 628 |
| 16 | 0.17 | 0.00 | 0.66 | 0.18 | 627 | 0.46 | 625 | 0.33 | 629 |
| 17 | 0.16 | 0.00 | 0.64 | 0.20 | 624 | 0.47 | 630 | 0.34 | 631 |

As shown in Table 1 above, in every case, a peak wavelength that almost corresponds to the predicted data was obtained. In particular, a europium-activated alkaline earth orthosilicate luminescent material that satisfies the following condition showed a peak wavelength of 600 nm or more upon excitation by ultraviolet at 254 nm.

$$(Sr_x,Ba_y,Ca_z,Eu_w)_2SiO_4 \qquad \text{formula 1}$$

In the formula 1, x, y, z and w are values that satisfy the following relational expressions 2, and 4 to 7, and satisfy the expression 3 when it was assumed that a was 573, b was 467, c was 623 and d was 736.

$$x+y+z+w=1 \qquad \text{expression 2}$$

$$600 \leq ax+by+cz+dw \qquad \text{expression 3}$$

$$0 \leq x/(1-w) \leq 0.95 \qquad \text{expression 4}$$

$$0 \leq y/(1-w) \leq 0.4 \qquad \text{expression 5}$$

$$0 < z/(1-w) \leq 0.95 \qquad \text{expression 6}$$

$$0.02 \leq w \leq 0.2 \qquad \text{expression 7}$$

In other words, among the luminescent materials shown in Table 1 above, this applies to those of Nos. 1, 4 to 7 and 9 to 17.

In the following, a white LED light-emitting device was fabricated by combining the luminescent material with light-emitting devices, and the properties thereof were measured.

EXAMPLE 1

A mixture of No. 5 luminescent material and a yellow light-emitting luminescent material was fabricated. A (Sr, Ba, Eu)$_2$SiO$_4$ luminescent material having a peak wavelength of 560 nm was used as a yellow light-emitting luminescent material, it was sieved in water in the final manufacturing process, and was then adjusted so that the particle size could lie within 5 to 30 μm. After the No. 5 luminescent material and the yellow light-emitting luminescent material were mixed into silicone resin at a concentration of 30 weight percent, the mixture was dispersed.

Then, a white LED light-emitting device was fabricated by applying the obtained dispersion element onto a blue light-emitting diode having a peak wavelength at 460 nm, which became Example 1.

Figure 10:
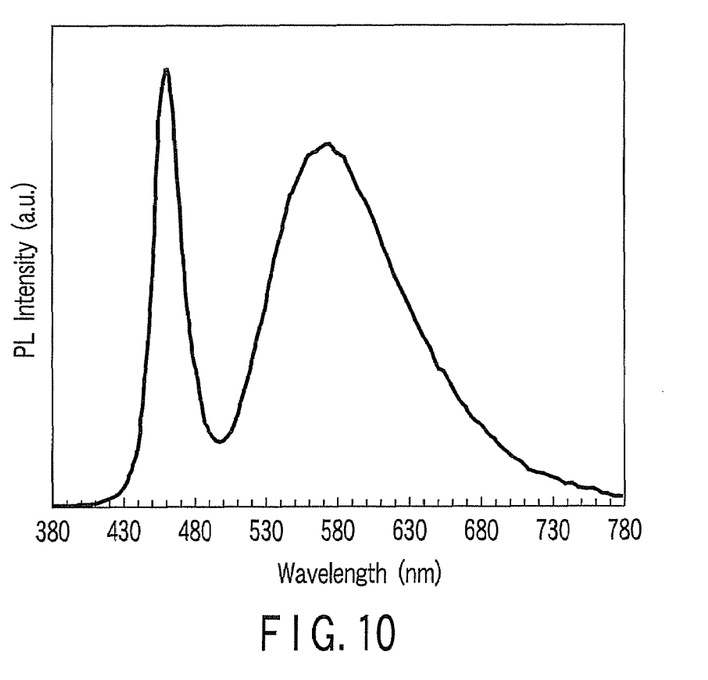
FIG. 10 is an emission spectrum of white LED according to the embodiment.

Adjustments were made to the mixing ratio of the luminescent materials and the amount of application of the dispersion element, so that the color temperature of the white light-emitting diode was 4200 K. The light-emitting properties were evaluated by applying a current of 20 mA to the light-emitting diode. The obtained white color temperature was 4200 K, Ra was 69.5 and R9 was −33.1. FIG. 10 shows the emission spectrum of the white LED of this embodiment.

COMPARATIVE EXAMPLE 1

Figure 11:
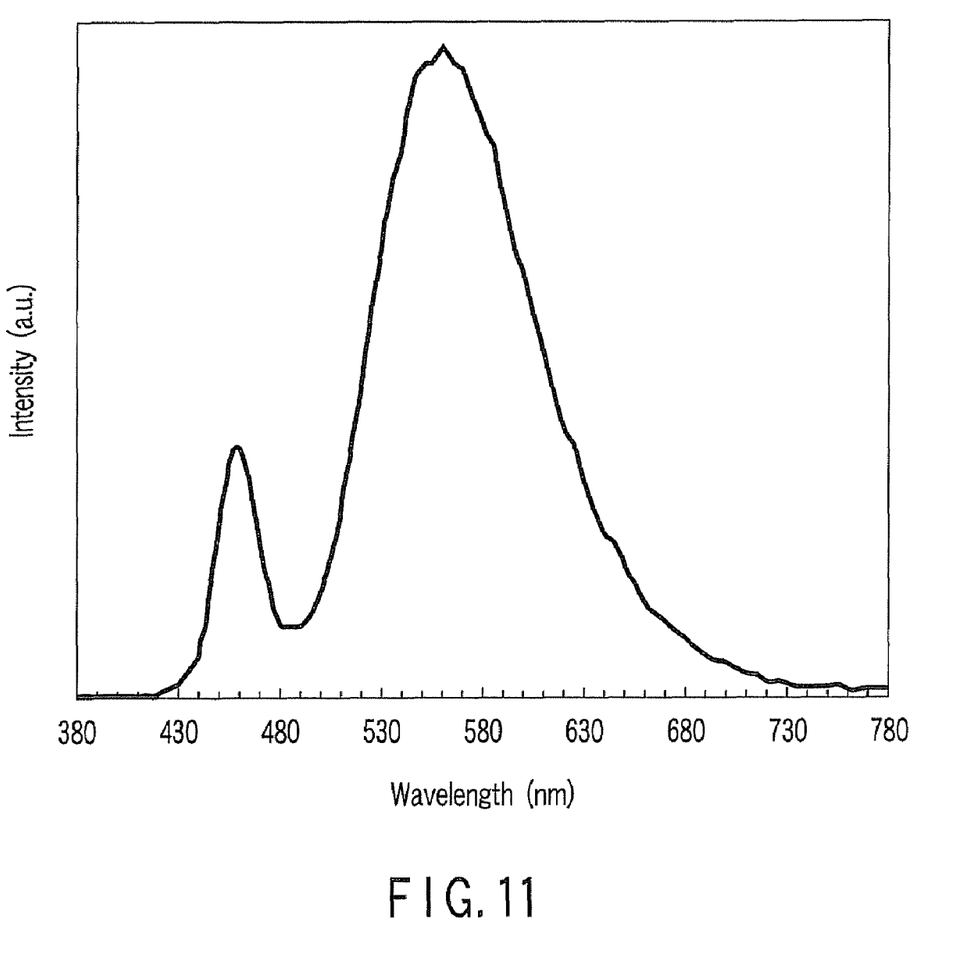
FIG. 11 is an emission spectrum of white LED of a comparative example.

A white LED of Comparative Example 1 was fabricated in a similar manner to Example 1, except that No. 5 luminescent material was not used. Similarly to Example 1, the amount of application was adjusted so that the color temperature would be 4200 K. The color rendering properties of the obtained LED was such that Ra was 51.7 and R9 was −131.8. It was noted that both Ra and R9 were considerably low, as compared with the white LED of Example 1, and that it was not practical. FIG. 11 shows the emission spectrum of white LED of Comparative Example 1. When FIG. 10 and FIG. 11 were compared, it can be seen that the light-emitting components in FIG. 11 are reduced at 600 nm or more.

EXAMPLES 2 AND 3

A white LED of Example 2 was fabricated in a similar manner to Example 1, except that the luminescent material was changed from No. 5 to No. 12. A white LED of Example 3 was also fabricated in a similar manner to Example 1, except that the luminescent material was changed from No. 5 to No. 15. In either case, adjustments were made to the mixing ratio with the yellow light-emitting luminescent material and the amount of application so that the color temperature of the white LED would be 4200 K. Table 2 below summarizes values of the color rendering evaluation number of the obtained white LED.

EXAMPLES 4 TO 6

White LEDs of Examples 4 to 6 were fabricated in a similar manner to Examples 1 to 3, except that the yellow light-emitting luminescent material was changed to YAG:Ce luminescent material having a peak wavelength of 570 nm. In either case, adjustments were made to the mixing ratio with the yellow light-emitting luminescent material and the amount of application so that the color temperature of white LEDs would be 4200 K. Table 2 below summarizes values of the color rendering evaluation numbers of the obtained white LEDs.

EXAMPLES 7 TO 9

White LEDs of Examples 7 to 9 were fabricated in a similar manner to Examples 1 to 3, except that the yellow light-emitting luminescent material was changed to a green light-emitting luminescent material. (Sr, Ba, Eu)$_2$SiO$_4$ luminescent material having an emission peak wavelength of 545 nm was used as a green light-emitting luminescent material. In either case, adjustments were made to the mixing ratio with the green light-emitting luminescent material and the amount of application, so that the color temperature of the white LEDs would be 4200 K. Table 2 below summarizes values of the color rendering evaluation numbers of the obtained white LEDs.

COMPARATIVE EXAMPLES 2 AND 3

A white LED of Comparative Example 2 was fabricated in a similar manner to Example 4, except that No. 5 luminescent material was not used. A white LED of Comparative Example 3 was also fabricated in a similar manner to Example 7, except that No. 5 luminescent material was not used.

In Comparative Example 3, the amount of application was adjusted so that a color temperature equivalent to 4200 K of Example 7 could be obtained. However, a higher color temperature (approximately 6600 K) could only be obtained, resulting in a smaller degree of freedom in the adjustment of color temperature. The fact that high color temperatures could only be adjusted meant that there was very little emission of orange and red components and thus color rendering properties were poor. Table 2 below shows the performance of the white LED of this Comparative Example.

TABLE 2

| | Used luminescent material and peak wavelengths | Ra | R9 |
|---|---|---|---|
| Example 1 | 560 nm-(Sr,Ba,Eu)$_2$SiO$_4$ + No. 5 | 69.5 | −33.1 |
| Example 2 | 560 nm-(Sr,Ba,Eu)$_2$SiO$_4$ + No. 12 | 73.0 | −13.8 |
| Example 3 | 560 nm-(Sr,Ba,Eu)$_2$SiO$_4$ + No. 15 | 74.3 | −4.4 |
| Example 4 | 570 nm-Y$_3$Al$_5$O$_{12}$: Ce + No. 5 | 76.1 | −0.9 |
| Example 5 | 570 nm-Y$_3$Al$_5$O$_{12}$: Ce + No. 12 | 76.9 | 1.7 |
| Example 6 | 570 nm-Y$_3$Al$_5$O$_{12}$: Ce + No. 15 | 78.0 | 7.3 |
| Example 7 | 545 nm-(Sr,Ba,Eu)$_2$SiO$_4$ + No. 5 | 76.1 | −4.9 |
| Example 8 | 545 nm-(Sr,Ba,Eu)$_2$SiO$_4$ + No. 12 | 83.4 | 31.2 |
| Example 9 | 545 nm-(Sr,Ba,Eu)$_2$SiO$_4$ + No. 15 | 88.5 | 58.7 |
| Comparative Example 1 | 560 nm-(Sr,Ba,Eu)$_2$SiO$_4$ | 51.7 | −131.7 |
| Comparative Example 2 | 570 nm-Y$_3$Al$_5$O$_{12}$: Ce | 72.1 | −24.3 |
| Comparative Example 3 | 545 nm-(Sr,Ba,Eu)$_2$SiO$_4$ | 53.2 | −156.3 |

As shown in Table 2 above, if the luminescent materials according to the embodiments were used (Examples 1 to 9), Ra was 69 or higher, and R9 was −33 or higher. In contrast, when the luminescent materials according to the embodiments were not used (Comparative Examples 1 to 3), Ra ranged from 51 to 72 and R9 ranged from −156 to −24, from which it can be seen that the color rendering properties were poorer. Thus, it could be confirmed that use of the luminescent materials according to the embodiments could improve the color rendering properties.

EXAMPLE 10

A mixture was fabricated by mixing a luminescent material having light emission in either a green or a yellow region (green series light-emitting luminescent material) with No. 15 luminescent material, in addition to the blue light-emitting luminescent material. $BaMgAl_{10}O_{17}$:Eu luminescent material having an emission peak wavelength of 444 nm was used as a blue light-emitting luminescent material, while $BaMgAl_{10}O_{17}$:Eu, Mn luminescent materials having a peak wavelength of 514 nm were used as the green series light-emitting luminescent material.

These luminescent materials were mixed and dispersed in silicone resin. Then, the obtained dispersion element was applied to a light-emitting diode chip having an emission peak wavelength of 395 nm, and made it Example 10. The amount of application of the luminescent materials was adjusted so that a color temperature of 4200 K could be obtained. Ra and R9 of the obtained white LED were 92.6 and 88.3, respectively.

EXAMPLES 11 TO 13

A white LED of Example 11 was fabricated in a similar manner to Example 10, except that the green series light-emitting luminescent material was changed to $(Ba, Sr, Eu)_2SiO_4$ luminescent material having an emission peak wavelength of 558 nm. A white LED of Example 12 was also fabricated in a similar manner to Example 10, except that the green series light-emitting luminescent material was changed to $(Sr, Ba, Eu)_2SiO_2$ luminescent material having an emission peak wavelength of 565 nm. Furthermore, a white LED of embodiment 13 was fabricated in a similar manner to Example 10, except that the green series light-emitting luminescent material was changed to $(Ba, Sr, Eu)_2SiO_4$ luminescent material having an emission peak wavelength of 540 nm.

In either case, the amount of application was adjusted so that the color temperature of the white LEDs would be 4200 K. Table 3 below summarizes values of the color rendering evaluation numbers of the obtained white LEDs.

COMPARATIVE EXAMPLES 4 AND 5

A white LED of Comparative Example 4 was fabricated in a similar manner to Example 10, except that No. 15 luminescent material was not used. A white LED of Comparative Example 5 was also fabricated in a similar manner to Example 10, except that No. 15 luminescent material was changed to $La_2O_2S$:Eu luminescent material. Table 3 below shows the performance of the obtained white LEDs.

TABLE 3

| | Used luminescent materials and peak wavelengths | Ra | R9 |
|---|---|---|---|
| Example 10 | 444 nm-$BaMgAl_{10}O_{17}$: EU + 514 nm-$BaMgAl_{10}O_{17}$: Eu,Mn + No. 15 | 92.6 | 88.3 |
| Example 11 | 444 nm-$BaMgAl_{10}O_{17}$: EU + 558 nm-$(Sr,Ba,Eu)_2SiO_4$ + No. 4 | 83.5 | 32.6 |
| Example 12 | 444 nm-$BaMgAl_{10}O_{17}$: EU + 565 nm-$(Sr,Ba,Eu)_2SiO_4$ + No. 4 | 81.5 | 23.0 |
| Example 13 | 444 nm-$BaMgAl_{10}O_{17}$: EU + 540 nm-$(Sr,Ba,Eu)_2SiO_4$ + No. 4 | 87.1 | 48.4 |
| Comparative Example 4 | 444 nm-$BaMgAl_{10}O_{17}$: EU + 565 nm-$(Sr,Ba,Eu)_2SiO_4$ | 52.0 | −135.6 |
| Comparative Example 5 | 444 nm-$BaMgAl_{10}O_{17}$: EU + 514 nm-$BaMgAl_{10}O_{17}$: Eu,Mn + $La_2O_2S$: Eu | 43.2 | −47.8 |

As shown in Table 3 above, if the luminescent materials according to the embodiments were used (Examples 10 to 13), Ra was 81 or higher, and R9 was 23 or higher, thus having excellent color rendering properties. In contrast, when the luminescent materials according to the embodiments were not used (Comparative Examples 4 and 5), Ra was 52 or lower and R9 was −47 or lower, thus the color rendering properties were poorer. Thus, it could be confirmed that use of the luminescent materials according to the embodiments could improve the color rendering properties.

EXAMPLES 14 TO 17

A white LED of Example 14 was fabricated in a similar manner to Example 1, except that the luminescent material was changed from No. 5 to No. 2, and a white LED of Example 15 was fabricated in a similar manner to Example 4, except that the luminescent material was changed from No. 5 to No. 8. A LED of Example 16 was also fabricated in a similar manner to Example 10, except that the luminescent material was changed from No. 15 to No. 2, and a white LED of Example 17 was fabricated in a similar manner to Example 12, except that the luminescent material was changed from No. 4 to No. 8. Table 4 below summarizes values of color rendering evaluation numbers of the obtained white LEDs.

TABLE 4

| | Used LED chip | Used luminescent material and peak wavelength | Ra | R9 |
|---|---|---|---|---|
| Example 14 | 460 nm-Blue LED | 560 nm-$(Sr,Ba,Eu)_2SiO_4$ + No. 2 | 68.7 | −40.7 |
| Example 15 | 460 nm-Blue LED | 570 nm-$Y_3Al_5O_{12}$: Ce + No. 8 | 75.8 | −3.5 |
| Example 16 | 393 nm to near-ultraviolet LED | 444 nm-$BaMgAl_{10}O_{17}$: Eu + 514 nm-$BaMgAl_{10}O_{17}$: Eu,Mn + No. 2 | 89.8 | 28.1 |
| Example 17 | 393 nm to near-ultraviolet LED | 444 nm-$BaMgAl_{10}O_{17}$: Eu + 565 nm-$(Sr,Ba,Eu)_2SiO_4$ + No. 8 | 71.0 | −33.3 |

As can be seen from the comparison between Examples 1 to 9 and Comparative Examples 1 to 3, the luminescent materials according to the embodiments that have the emission peak of 600 nm or more considerably improved the color rendering properties at the same color temperatures. A similar result can be expected in the comparison between Examples 10 to 13 and Comparative Examples 4 to 5.

As already described above, the inventors discovered that even a luminescent material that cannot have a peak wavelength of 600 nm or more upon excitation at 254 nm can obtain a peak wavelength of 600 nm or more by being excited by light having an appropriate wavelength. To be more specific, this is the case in which a blue LED having a peak wavelength at 460 nm or a near-ultraviolet LED having a peak wavelength at 393 nm is used as a light source, and applies to the white LEDs of Examples 14 to 17.

As shown in Table 4 above, the white LEDs of Examples 14 and 15 have higher color rendering properties than those in Comparative Examples 1 to 3, and thus can be put to practical use. In addition, the white LEDs of Examples 16 and 17 have higher color rendering properties than those in Comparative Examples 4 and 5, and thus can be put to practical use.

The luminescent materials and light-emitting device according to the embodiments can be used in a variety of illuminating devices or displays such as a light source for illumination, LED display, backlight source for a personal computer or portable phone, etc., traffic light, illumination switch, in-car stop lamp, various types of sensors and various types of indicators, etc.

According to one aspect of the present invention, a europium-activated alkaline earth orthosilicate luminescent material having an emission peak in a longer wavelength region and a method of manufacturing thereof are provided. According to the aspect of the present invention, a light-emitting device with high color rendering properties is provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A europium-activated alkaline earth orthosilicate luminescent material comprising:
    a compound having a composition represented by a following formula 1 and showing an emission band having a peak wavelength of 600 nm or more when the compound is excited by ultraviolet radiation having a wavelength of 254 nm:

$(Sr_xBa_yCa_zEu_w)_2SiO_4$   formula 1 wherein, x, y, z and w satisfy following relational expressions 2, and 4 to 7, and are values satisfying the expression 3 when a, b, c and d are assumed to be 573, 467, 623 and 736, respectively:

$x+y+z+w=1$   expression 2

$600 \leq ax+by+cz+dw$   expression 3

$0 \leq x/(1-w) \leq 0.95$   expression 4

$0 \leq y/(1-w) \leq 0.4$   expression 5

$0 < z/(1-w) \leq 0.95$   expression 6

$0.02 \leq w \leq 0.2$   expression 7.

2. The luminescent material according to claim 1, wherein w is 0.05 or higher and 0.15 or lower.

3. The luminescent material according to claim 1, wherein the luminescent material shows an emission band having a peak wavelength of 600 nm or more even when the luminescent material is excited by blue light having a wavelength of 460 nm.

4. A europium-activated alkaline earth orthosilicate luminescent material comprising:
    a compound showing an emission band having a peak wavelength of 600 nm or more when the compound is excited by ultraviolet radiation having a wavelength of 254 nm, and also showing an emission band having a peak wavelength of 600 nm or more even when the compound is excited by blue light having a wavelength of 460 nm.

5. The luminescent material according to claim 4, wherein the compound has a composition represented by a following formula 1:

$(Sr_xBa_yCa_zEu_w)_2SiO_4$   formula 1 wherein, x, y, z and w satisfy following relational expressions 2, and 4 to 7, and are values satisfying the expression 3 when a, b, c and d are assumed to be 573, 467, 623 and 736, respectively:

$x+y+z+w=1$   expression 2

$600 \leq ax+by+cz+dw$   expression 3

$0 \leq x/(1-w) \leq 0.95$   expression 4

$0 \leq y/(1-w) \leq 0.4$   expression 5

$0 < z/(1-w) \leq 0.95$   expression 6

$0.02 \leq w \leq 0.2$   expression 7.

6. The luminescent material according to claim 5, wherein w is 0.05 or higher and 0.15 or lower.

7. A method of manufacturing a europium-activated alkaline earth orthosilicate luminescent material according to claim 1, comprising:
    storing a mixture of raw materials in a vessel;
    applying a first sintering to the mixture of the raw materials under a reducing atmosphere of $N_2/H_2$ to obtain a first sintered material;
    pulverizing the first sintered material to obtain a pulverized first sintered material;
    storing the pulverized first sintered material into a vessel;
    placing the vessel storing the pulverized first sintered material in a furnace and substituting a nitrogen gas in the furnace under a reduced pressure; and
    applying a second sintering to the pulverized first sintered material under a reducing atmosphere of $N_2/H_2$ containing hydrogen at a concentration of 5% or more and less than 100% to obtain a secondary sintered product.

8. The method according to claim 7, wherein the reduced pressure is 1000 Pa or less.

9. A method of manufacturing a europium-activated alkaline earth orthosilicate luminescent material according to claim 4, comprising:
    storing a mixture of raw materials in a vessel;
    applying a first sintering to the mixture of the raw materials under a reducing atmosphere of $N_2/H_2$ to obtain a first sintered material;
    pulverizing the first sintered material to obtain a pulverized first sintered material;
    storing the pulverized first sintered material into a vessel;
    placing the vessel storing the pulverized first sintered material in a furnace and substituting a nitrogen gas in the furnace under a reduced pressure; and applying a second sintering to the pulverized first sintered material under a reducing atmosphere of $N_2/H_2$ containing hydrogen at a concentration of 5% or more and less than 100% to obtain a secondary sintered product.

10. The method according to claim 9, wherein the reduced pressure is 1000 Pa or less.

11. A light-emitting device comprising:
a light-emitting element emitting light, the light having a wavelength ranging from 360 to 480 nm; and
a luminescent layer comprising a luminescent material configured to be irradiated with the light, at least part of the luminescent material being the luminescent material of claim 1.

12. The light-emitting device according to claim 11, wherein the luminescent material occupying at least part of the luminescent material is first luminescent material, the luminescent layer further comprises second luminescent material having a peak wavelength that is shorter than 600 nm.

13. The light-emitting device according to claim 12, wherein the second luminescent material is a europium-activated alkaline earth orthosilicate luminescent material.

14. A light-emitting device comprising:
a light-emitting element emitting light, the light having a wavelength ranging from 360 to 480 nm; and
a luminescent layer comprising a luminescent material configured to be irradiated with the light, at least part of the luminescent material being the luminescent material of claim 4.

15. The light-emitting device according to claim 14, wherein the luminescent material occupying at least part of the luminescent material is first luminescent material, the luminescent layer further comprises second luminescent material having a peak wavelength that is shorter than 600 nm.

16. The light-emitting device according to claim 15, wherein the second luminescent material is a europium-activated alkaline earth orthosilicate luminescent material.

17. A light-emitting device comprising:
a light-emitting element emitting light, the light having a wavelength ranging from 360 to 480 nm; and
a luminescent layer comprising a luminescent material configured to be irradiated with the light, at least art of the luminescent material being a europium-activated alkaline earth orthosilicate luminescent material having a peak wavelength of 600 nm or more.

18. The light-emitting device according to claim 17, wherein the luminescent material occupying at least part of the luminescent material is first luminescent material, the luminescent layer further comprises second luminescent material having a peak wavelength that is shorter than 600 nm.

19. The light-emitting device according to claim 18, wherein the second luminescent material is a europium-activated alkaline earth orthosilicate luminescent material.

* * * * *